United States Patent [19]

Morgando

[11] 4,331,061
[45] May 25, 1982

[54] METHOD AND APPARATUS FOR TEACHING MUSICAL INSTRUMENTS

[76] Inventor: John P. Morgando, 3909 El Conlon, Las Vegas, Nev. 89102

[21] Appl. No.: 935,345

[22] Filed: Aug. 21, 1978

[51] Int. Cl.³ .............................................. G09B 15/04
[52] U.S. Cl. ............................... 84/470 R; 84/477 R
[58] Field of Search ................ 84/470 R, 477 R, 478, 84/470 P, 479-485 SR; 353/90

[56] References Cited

U.S. PATENT DOCUMENTS

| | | | |
|---|---|---|---|
| 3,358,558 | 12/1967 | Bradley | 353/90 |
| 3,482,480 | 12/1969 | Decker | 84/470 |
| 3,817,144 | 6/1974 | Okamoto | 84/470 |
| 3,895,555 | 7/1975 | Peterson | 84/470 |

*Primary Examiner*—L. T. Hix
*Assistant Examiner*—S. D. Schreyer
*Attorney, Agent, or Firm*—Romney, Schaap, Golant, Disner & Ashen

[57] ABSTRACT

Method and apparatus for simultaneously teaching a plurality of students how to play a musical instrument including programmed audio-visual instruction by pre-recorded audio inputs, prearranged note combinations displayed on a student light strip, confirmation of right or wrong answers on periodic quiz questions, sequential pictures projected on a screen, and correlated printed lesson materials, which programmed instruction may be stopped by the teacher in order to selectively instruct certain students by broadcasting oral instructions, and by playing a master keyboard which activates the student light strip. A teacher's console is provided for collectively monitoring the student quiz results, and for selectively listening to individual student musical performances during the programmed instruction period. The pre-recorded audio inputs are on one channel of a master tape, and coded impulses on a second channel of the master tape activate the instrument light strip, control the picture projectors, and pre-set quiz answer display panels.

2 Claims, 4 Drawing Figures

METHOD AND APPARATUS FOR TEACHING MUSICAL INSTRUMENTS

The invention relates generally to audio-visual programmed teaching of musical instruments and more specifically to a method and apparatus for simultaneously teaching a group of students how to play a musical instrument by having an instructor monitor the individual student's progress in order to provide supplemental instruction to certain of the students.

Programmed teaching has provided a way for maintaining high standards of teaching while at the same time enabling students to progress rapidly in the course of learning a new skill such as playing a musical instrument. A typical prior art method and apparatus for teaching a musical instrument through programmed lessons featuring an instrument light strip is disclosed in U.S. Pat. No. 3,482,480 issued Dec. 9, 1969 for Teaching Apparatus For Keyboard Instruments. However, the aforesaid prior art patent is limited to teaching students one at a time, with a single console serving both the instructor and the student.

Accordingly, it is an object of the present invention to enable one instructor to teach simultaneously a group of students a programmed audio-visual lesson, while at the same time enabling the instructor to monitor and provide individualized audio and visual inputs to certain students during the course of a programmed lesson.

More specifically, it is an object of the present invention to enable the instructor to selectively listen to each student's musical performance, collectively monitor each student's programmed quiz results, and periodically stop the programmed teaching course in order to broadcast oral instructions to certain students as well as activate certain student light strips by playing the master keyboard at the teacher's console. In addition, it is an object of the present invention to enable the teacher to follow along and view all features of the programmed teaching course concurrently with the students, including pictorial illustrations and diagrams projected by a film projector unit and visual indicia of musical notations and concepts displayed as in printed course materials supplied to each student.

A further object is to provide a multi-track tape which carries the pre-recorded audio portion of the program lesson on one channel, and which carries coded information in digital form on the second channel for purposes of activating the student light strips in pre-arranged note combinations, advancing and dissolving back and forth between two sets of slide pictures, and confirming visually the correct or incorrect status of student answers to periodic quiz questions.

Additional objects, purposes, and advantages of the invention will be evident to those skilled in the art in view of the preferred embodiment of the invention illustrated in the accompanying drawing and described in detail hereinafter.

Figure 1:
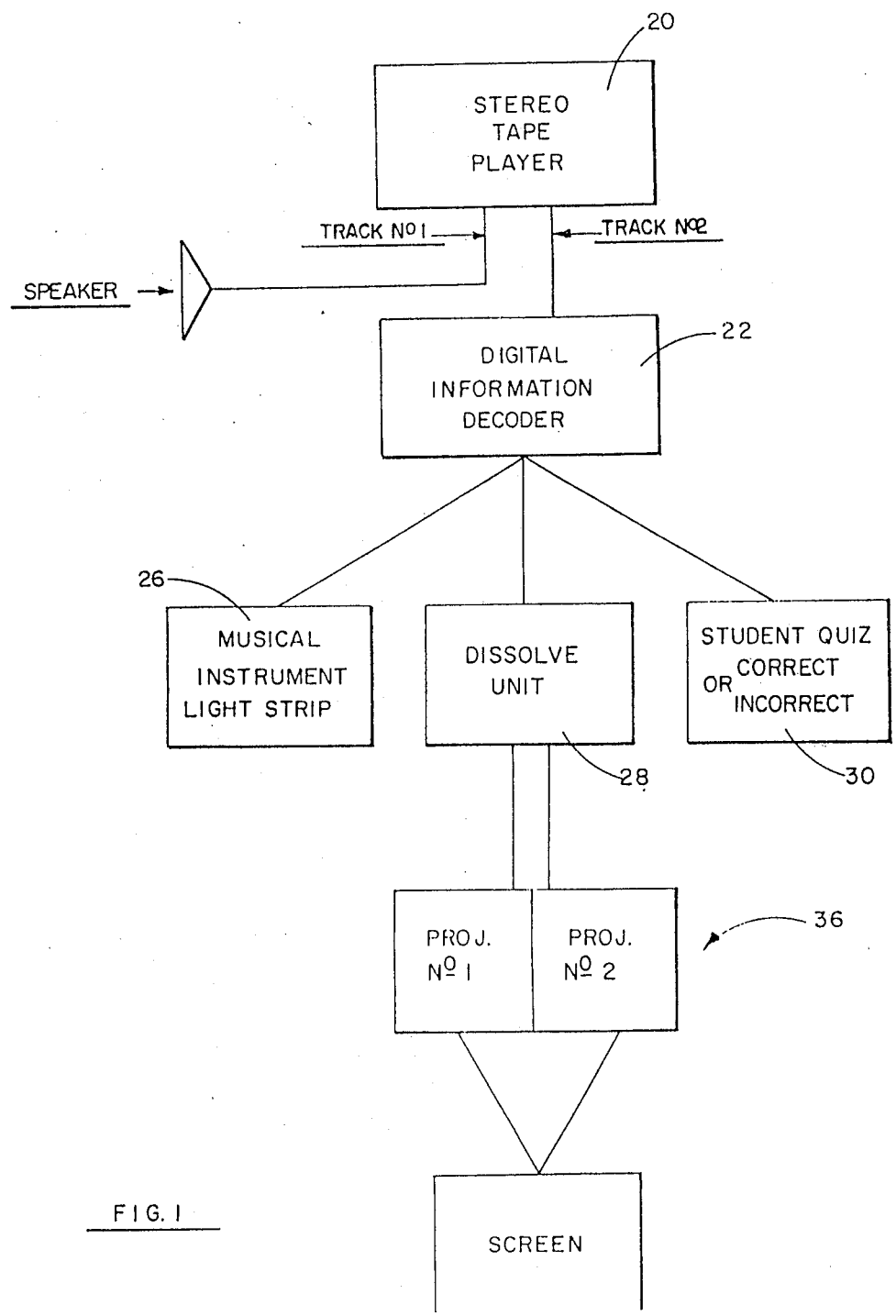
FIG. 1 is a block diagram of the programmed portion of the invention showing use of a two-track tape playback unit.
Figure 2:
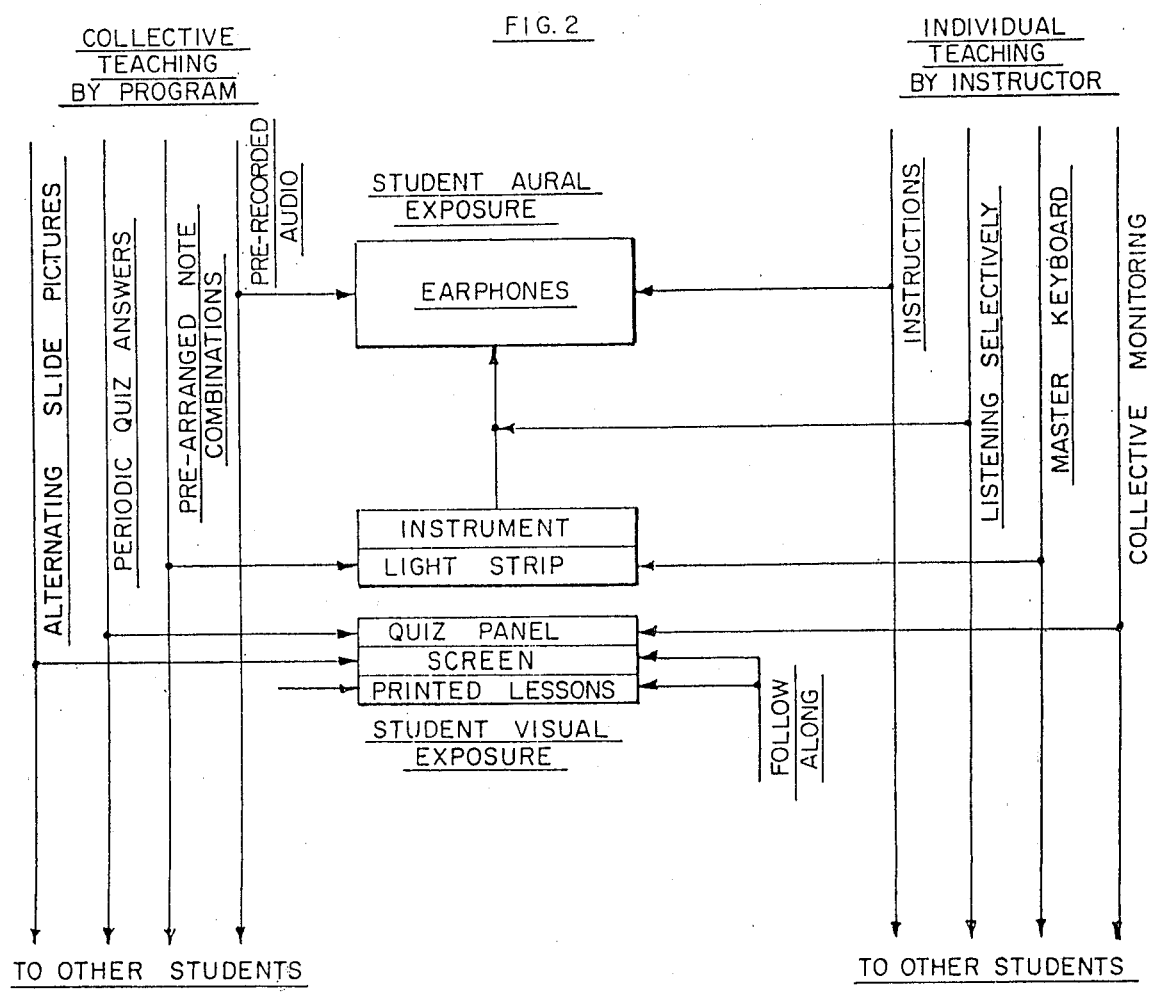
FIG. 2 is a communications diagram showing the programmed teaching inputs to an individual student learning station, as well as the monitoring and supplemental contacts by an instructor.

Referring generally to the invention, the illustrated embodiment shows the use of programmed audio-visual inputs simultaneously to individual musical instrument learning centers which typically include the instrument-related light strip adjacent the keyboard, a student quiz panel, a printed lesson manual, and a viewing screen located at the student learning center or placed in a central position to be viewed collectively by all the students. Additionally, each student learning center includes a set of earphones to be worn during the course of the lesson. In some teaching room configurations, a loudspeaker may be used instead of earphones.

The various inputs from the programmed part of the teaching system include a pre-recorded audio input to the earphones, a series of prearranged note combinations to the light strip, periodic questions and confirmation of correct or incorrect answers to the student quiz panel, and preferably two series of slides which are alternately projected in sequence on the screen in accordance with pre-determined dissolve time periods as one picture phases in and another phases out.

The non-programmed communication inputs to each student include his own musical performance, the activation of the student light strip by the teacher's keyboards, and the teacher's broadcast of oral instructions.

The teacher monitoring features of the present method and apparatus include selective listening of individual student's musical performances, and collective monitoring of all student quiz panels to determine those students giving incorrect answers. Additionally, the printed lesson materials include visual indicia of musical notations and concepts correlated with the audio-visual programmed materials, and the instructor has a follow-along set of such student materials. Follow-along instructor monitoring of the pictorial illustrations and diagrams projected on the screen is also provided.

This unique combination of programmed and individualized teaching is usable for any musical instrument where single tones are played as in woodwind instruments and the like and is especially well suited for multiple tone instruments such as guitars, pianos and organs. The apparatus for the audio-visual programming of the presently preferred embodiment includes a magnetic tape stereo playback unit preferably having two or more channels, a digital information decoder unit, a dissolve unit, student instrument light strips, two slide projectors, a projection screen, student quiz panels and a master control console for activating and controlling the operation of the aforesaid components. The teaching program software includes two sets of slide pictures, a prerecorded two-track tape, and printed lesson materials, all correlated and coordinated with one another. By providing an instructor with high quality programmed lesson materials designed for use in this system, the instructor is able to supplement the programmed instruction with individual monitoring and inputs to the students within a time-span that is believed to be shorter than any other known method of teaching music instruction.

Figure 4:
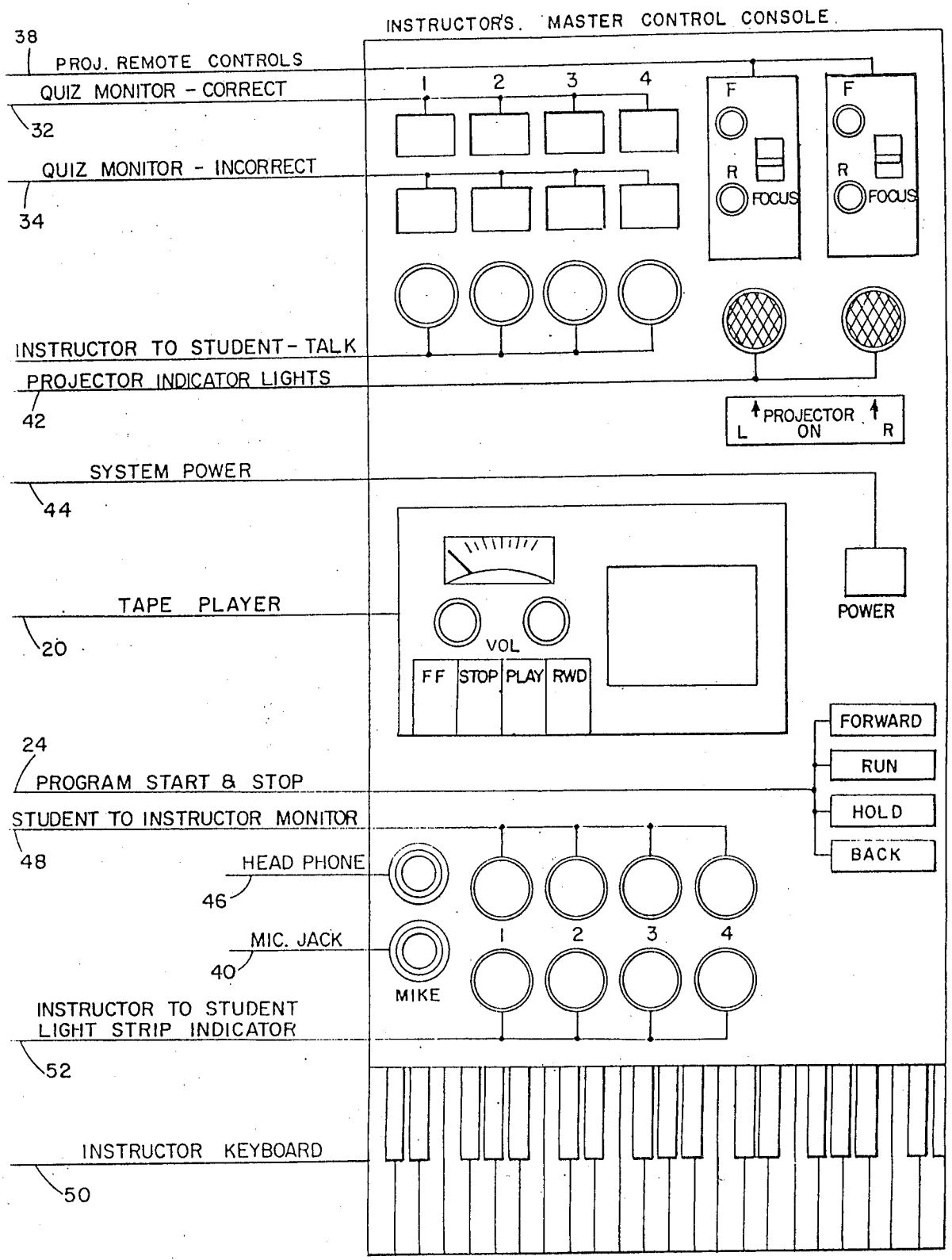
FIG. 4 is a diagrammatic representation of an exemplary teacher's console for implementing FIG. 2.

Referring more specifically to FIGS. 1 and 4, the magnetic tape stereo playback unit 20 includes two outputs separate from one another. The first output is the audio and this is played back to the student headsets or speakers. The second output is the digital code or command data which is sent to a digital information decoder 22. The tape playback unit is controlled by the instructor at the master control console at 24 and can be stopped or started at any time during the program by the instructor. The preferred form also includes forward and reverse controls which also move the slides forward or backward correspondingly. The digital information decoder 22 receives digital code data from the second output of the tape playback unit 20.

A musical instrument light strip 26 is provided for each student instrument and is preferably made up of small fourteen volt lamps. Each lamp is wired on a separate circuit with a common ground to all. The strip is plugged into the decoder 22 with a conventional slot keyed connector or plug (not shown). The decoder unit will upon command activate singly or in various combinations all the lights on the strip. The light strips can be varied in length and amount of lights depending on the musical instrument which is being taught, and are used to display to the student the proper notes and fingering for that particular instrument.

The digital information decoder 22 sends coded information to a visual program control device, identified here as a dissolve unit 28. This dissolve unit is capable of a "quick-cut" change whereby the screen image is alternated from one projector to another very quickly. It is also capable of delayed dissolving from one projector to another by slowly lowering the projecting lumens on one projector while raising the lumens on another. The effect of such a conventional technique is to lap a picture on another while changing images. The dissolve durations preferably range from two seconds to fifteen seconds for maximum flexibility.

Figure 3:
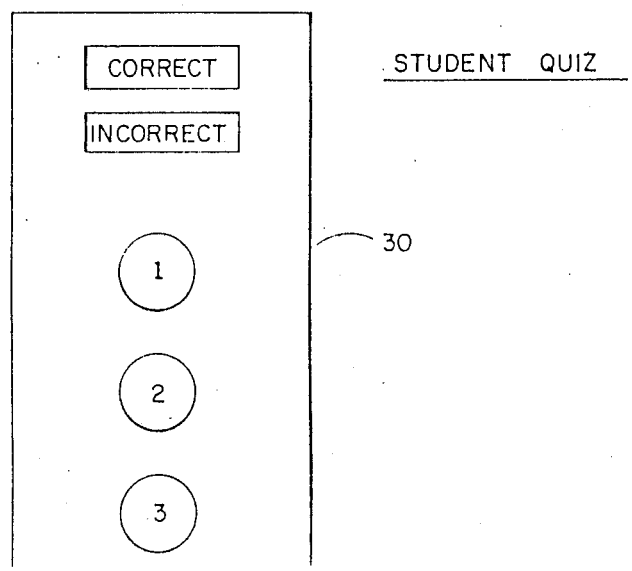
FIG. 3 is a front elevational view of an exemplary student quiz display panel.

In order to implement the student quiz, the digital information decoder will set up a composition of one positive and two negatives. The one positive will key the "correct" indicator light and the two negatives will key the "incorrect" indicator light, as shown on the student quiz panel 30 (FIG. 3) and on the matching monitor lights for "correct" 32 and "incorrect" 34 on the instructor's master control console (FIG. 4). It is necessary, as in most teaching endeavors, to test the student at various intervals in his course of study. My testing is accomplished in the following manner: all questions are multiple choice presented in video (slides or pictures) and at various times with both audio (tape) and video (pictures). Each student has a panel mounted at his learning station equipped with three buttons which are labeled 1, 2 and 3. When a question is asked, the student has a choice of one out of three answers represented by the three buttons. The student indicates his choice or answer by pushing the appropriate button. If a student has chosen the right answer, the indicator light on his panel and on the instructor's control panel will read "correct". If a wrong answer is chosen, an indicator light will read "incorrect" on his panel and also on the instructor's console panel.

A minimum of two projectors 36 are used which preferably are equipped with universal slide holders having eighty or more compartments. When a signal to "show" is given from the digital information decoder through the dissolve unit to either projector, the lamp in the projector comes on and the picture on the slide in the slide tray is projected on the screen. The lamp may come up slowly, so as to fade-up the picture on the screen or it may come up full intensity, depending fully on what command is sent from the digital information decoder through the dissolve unit to the projector. When a signal is received by the dissolve unit from the digital information decoder to change from one projector to the other, the projector which has completed showing a picture will advance to the next slide with its lamp out or "dark" and the alternate projector is then on "show" and this picture appears on the screen. This happens automatically unless a specific signal is sent to prevent the advance of the slide tray or holder. In the event of this signal, the lamp goes "dark" but the slides do not advance.

The teacher master control console is the controlling station for all of the apparatus. Beginning at the top of FIG. 4 are shown projector remote controls 38 to allow the teacher to rapidly advance or reverse the projector slides as desired. The quiz monitor-correct 32 is a bank of lights (shown here as four in number for illustration purposes only as this number is only limited by the amount of students which are being taught in a group and can range from two students to any number of students in a group). Each light represents a student learning station and corresponds to the student quiz panel located at the learning station. The bank of such lights indicates to indicate to the instructor which of all of the students have chosen a correct answer to any given question.

When a group of students are being given the programmed instruction simultaneously, they are listening to the audio portion of programmed lesson material preferably on individual head sets which are plugged into their learning station or instrument. The teacher is able to communicate to any one or all of the students by means of microphone which is plugged into a microphone jack 40 on the teacher's master control console. The four circles represent switches to each learning station or instrument (shown here as four in number for illustration purposes only and can range from two switches to any number of students in a group). The teacher can select to communicate to an individual student by opening the proper switch to that learning station. The teacher can also select to communicate with all of the students in the group by opening all of the switches at the same time.

Two lights 42 are mounted on the teacher's console one for each projector, to indicate to the teacher which projector is showing the picture on the screen at any given time.

A system power switch 44 is mounted on the teacher's control panel which is an on/off switch for the entire apparatus. After the system power switch is turned on, the teacher then presses "run" which starts the tape, the projectors and all other components in the apparatus. At any given time in the lesson, the teacher may elect to pause the apparatus for live verbal instructions to the students by pressing the hold switch, as previously described.

The teacher may choose from time to time to monitor or listen to one or all of the students at their learning station or instrument. This is done by the instructor plugging a head-set into a head phone jack 46 and selecting any of the switches 48 (shown here as four in number for illustration only and can range from two to any number in a group) that is connected to the student instrument or learning station. In this manner, the teacher can listen to a student's musical performance without interrupting the programmed lesson.

The teacher may choose to "pause" the apparatus at given times and reinforce the instructions of what keys or notes the student should be playing. This is done by means of a teacher's keyboard 50 (a piano keyboard is chosen for illustration inasmuch as all of the notes of any musical instrument can be played on a piano keyboard). This keyboard is mounted on the teacher's console and is wired through the digital information decoder and into each of the light strips 26 at each student's learning station or instrument. A series of switches 52 are placed above the teacher's keyboard and by either opening one to a specific station or opening several of the switches to the learning stations, the teacher can press on the correct keys or notes and these keys or notes will be displayed on the musical instrument light strip at one, several, or all of the learning stations.

It is believed that the foregoing apparatus and method is unique in the field of music instruction in enabling the combined use of programmed and individualized audio-visual instruction. It is also believed that with the aid of this unique system, it is possible for a music instructor to relay information to a student or a group of students in such a clear and concise manner through audio instruction, visual pictures and corresponding light indicators related to the musical instrument being taught, that instruction time for the student is greatly reduced, complete understanding by the student is enhanced and it is possible to efficiently instruct a larger number of students at one time than is possible by any other instruction method presently known.

Although an exemplary embodiment of the invention has been disclosed for illustrative purposes, it will be understood that various changes, modifications and substitutions may be incorporated in such embodiment without departing from the invention as defined by the claims hereinafter.

What I claim is:

1. An audio visual apparatus for enabling a single instructor at a Teacher's Console to simultaneously teach a plurality of students at their individual learning centers how to play a musical instrument comprising:

a multi-channel magnetic tape play-back system for transmitting signals recorded on multi-channel tape;

a multi-channel tape having a first channel containing predetermined audio inputs for communicating a predetermined sequence of aural instructions, audible information and audible quiz questions to each student;

a second channel of said multi-channel tape containing coded impulses in the form of digital signals for activating and deactivating various elements of said audio visual apparatus;

a screen;

two projectors activated by certain of said digital signals output by said second channel of said play-back system for displaying on said screen a sequence of pictures to the students, said sequence of pictures being previously arranged to present a lesson of instruction and quiz questions to the students;

a plurality of student learning centers each including a musical instrument and a student light strip comprising a plurality of lights aligned in a strip and arranged such that each light corresponds to a musical note or a position on said musical instrument for the student to manually manipulate in order to play a desired note or combination of notes;

a teacher's console including:

microphone means including a first set of actuating switches operationally connected to each of said plurality of student learning centers for optionally selecting and speaking to at least one student by the instructor, sound monitoring means including a second set of actuating switches operationally connected to said instrument at each of said plurality of student learning centers and usable by the instructor for optionally selecting and listening to an individual's musical performance, a master instrument coupled with said plurality of lights of each of said plurality of student learning centers including a third set of actuating switches operationally connected to each of the plurality of student learning centers for optionally selecting and activating said plurality of lights associated with at least one student's learning center in accordance with the notes played by the instructor on said master instrument, quiz monitoring means operationally connected with each of said plurality of student learning centers to identify those learning centers where correct or incorrect answers are given by the student, switch control means coupled to said play-back system and said projectors for stopping the progress of the programmed teaching whenever the instructor desires to interrupt and optionally use said microphone means or said master instrument to explain or supplement the programmed teaching, said switch control means including means for selectively stopping, skipping forward, or skipping backwards to selectively coordinate the programmed teaching with the optional interruption by the instructor;

said plurality of student learning centers also including:

student speaker means directly coupled to said first channel of said play-back system for communicating pre-recorded verbal instructions and audible information and coupled to said microphone means for communicating live verbal instructions from the instructor to the students;

a set of earphones connected to said speaker means to enable the student to clearly hear the signals output by said speaker means without hearing extraneous and distracting noises generated by the other students;

means connecting said musical instrument with said student speaker means and with said sound monitor means to enable the student to hear his own musical performance on said instrument and to enable the instructor to optionally listen to said student's musical performance;

a quiz response panel including a plurality of buttons for use by a student to indicate his answers to said quiz questions posed periodically by said pictures and/or said pre-recorded audible information on said first channel of said tape, said quiz response panel also including quiz result display lights activated by certain of said digital signals to indicate whether such answers are correct;

a decoder connected to said second channel of said play-back system and to said projectors, said plurality of lights and said quiz response panel for decoding said digital signals and activating said projector units, said plurality of lights, and said quiz results display lights, in correlation with the pre-recorded instructions and information on the first channel of said multi-channel tape;

a dissolve unit connected to said digital information decoder and said projectors, said dissolve activated by said decoder to alternately phase in a picture from one projector and phase out a picture from the other projector over different pre-determined dissolve periods; and, printed lesson materials included with each of said student learning centers and with said teacher's console, said materials correlated with said programmed teaching to enable the instructor and students to follow the lesson.

2. A method of combining programmed audio-visual instruction with individual instruction by a teacher for simultaneously instructing two or more students each learning to play on an individual musical instrument at separate learning stations, wherein the programmed instruction steps comprise:

(1) broadcasting pre-recorded aural instructions, audible information and audible quiz questions to the students collectively;

(2) projecting a previously arranged sequence of pictures presenting a lesson of instruction and quiz questions to the students;

(3) activating previously selected and recorded combinations of lights located at each learning station indicating notes and positions for the students to manually manipulate in order to play a desired note or combination of notes;

(4) indicating those learning centers where correct and incorrect answers to the quiz questions are given by the student;

(5) transmitting each individual musical performance to be heard by the student making the performance without hearing any of the other students' musical performances; and, (6) displaying at each learning station printed instructional material correlated with the audio-visual material of said previously recited programmed instructing steps enabling the students to follow the programmed audio-visual instruction;

and wherein the individual instruction steps comprise:

(1) passively monitoring the programmed instruction program by viewing the sequence of pictures during said projecting step, by listening to the aural instruction, audible information and audible quiz questions during said broadcasting step, and by viewing printed instructional material correlated with the programmed instruction program;

(2) selectively monitoring the individual music performances of the students during said programmed instruction steps;

(3) collectively monitoring the individual quiz performances of the students during said programmed instruction steps;

(4) selectively broadcasting supplemental oral information to certain of the learning stations;

(5) playing a master instrument to selectively activate combinations of lights located at certain learning stations indicating notes and positions for the students to manually manipulate in order to play a desired note or combination of notes; and, (6) based on the results of said selective and collective monitoring steps, stopping as often as necessary the programmed instruction steps and during said stopping step performing said selectively broadcasting step and said playing step selectively broadcasting to, and selectively activating combinations of lights at, one, some, or all of the learning stations.

* * * * *